(12) United States Patent
DeStasio et al.

(10) Patent No.: US 11,833,964 B2
(45) Date of Patent: Dec. 5, 2023

(54) STRUCTURAL BASE AND SECUREMENT MECHANISM FOR AN INTERIOR DELIVERY CONTAINER IN A VEHICLE

(71) Applicant: GM Cruise Holdings LLC, San Francisco, CA (US)

(72) Inventors: Alexis DeStasio, San Francisco, CA (US); Timothy Jon Meador, Fairfield, CA (US); Andrew Clavijo, Hayward, CA (US); Jordan Hale Factor, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 68 days.

(21) Appl. No.: 17/508,084

(22) Filed: Oct. 22, 2021

(65) Prior Publication Data

US 2023/0097471 A1    Mar. 30, 2023

Related U.S. Application Data

(60) Provisional application No. 63/250,418, filed on Sep. 30, 2021.

(51) Int. Cl.
*B60R 7/04* (2006.01)
(52) U.S. Cl.
CPC .................... *B60R 7/043* (2013.01)
(58) Field of Classification Search
CPC .... B60R 7/04; B60R 7/043; B60R 2011/0084
USPC ............................................ 296/37.15, 24.4
See application file for complete search history.

(56) References Cited

U.S. PATENT DOCUMENTS

| | | | | | |
|---|---|---|---|---|---|
| 2,744,667 | A | * | 5/1956 | Maloney | B60R 7/043 224/559 |
| 2,812,992 | A | * | 11/1957 | Kermit | B60R 9/055 312/351 |
| 3,092,428 | A | * | 6/1963 | Kerschner | B25H 3/02 312/289 |
| D299,186 | S | * | 1/1989 | Sills | D12/425 |
| 4,917,430 | A | * | 4/1990 | Lawrence | B60R 9/02 224/281 |
| 5,007,569 | A | * | 4/1991 | Zarb | B60R 7/043 224/543 |
| 5,628,439 | A | * | 5/1997 | O'Hara | B60R 7/043 224/563 |
| 5,964,492 | A | * | 10/1999 | Lyon | B60R 9/00 224/404 |

(Continued)

FOREIGN PATENT DOCUMENTS

| | | |
|---|---|---|
| CA | 2845013 C * | 10/2019 |
| DE | 19644802 A1 | 4/1998 |

(Continued)

*Primary Examiner* — Justin M Larson
(74) *Attorney, Agent, or Firm* — Akona IP PC

(57) ABSTRACT

There is disclosed herein examples of a securement structure for a delivery container in a vehicle, the securement structure comprising a frame removably attached to a chassis of the vehicle, and the frame supports the delivery container securely when the vehicle is in motion. In some embodiments, the frame comprises tubes in a shape that conforms to a space corresponding to a rear-seat of the vehicle, the frame comprising a front frame, a base frame, and a back frame.

20 Claims, 10 Drawing Sheets

(56) References Cited

U.S. PATENT DOCUMENTS

| | | | | |
|---|---|---|---|---|
| 6,142,574 | A * | 11/2000 | Alexander | B60N 2/2839 297/188.2 |
| 6,386,412 | B1 * | 5/2002 | Konechne | B60R 7/04 D12/426 |
| 6,422,440 | B1 * | 7/2002 | Stone | B60R 7/043 D12/426 |
| 7,048,320 | B2 * | 5/2006 | Rubel | B60R 7/02 296/37.6 |
| D566,646 | S * | 4/2008 | Whittaker | D12/414.1 |
| 7,350,681 | B2 * | 4/2008 | Polburn | B60R 7/005 296/37.16 |
| 8,469,324 | B2 * | 6/2013 | Bostrom | F17C 13/084 297/188.04 |
| 8,662,367 | B2 * | 3/2014 | Panaro | B60R 11/00 224/542 |
| 8,720,991 | B2 * | 5/2014 | Macleod | B60R 7/043 297/188.2 |
| 8,757,458 | B2 * | 6/2014 | Nebel | B60R 9/00 224/42.32 |
| 9,173,374 | B2 * | 11/2015 | Hovsepian | A01K 1/0272 |
| 10,336,261 | B2 * | 7/2019 | White | B60R 5/045 |
| 11,425,886 | B2 * | 8/2022 | Weerappuli | A01K 1/0272 |
| 11,440,478 | B2 * | 9/2022 | Meador | B60R 7/043 |
| 11,498,488 | B2 * | 11/2022 | Setina | B60R 21/026 |
| 2002/0140246 | A1 * | 10/2002 | Worrell | B60N 2/26 296/37.8 |
| 2003/0057747 | A1 * | 3/2003 | Johnston | B60N 3/004 297/188.06 |
| 2004/0251704 | A1 * | 12/2004 | Rubel | B60R 7/02 296/37.6 |
| 2008/0067828 | A1 * | 3/2008 | Sturt | B60N 3/12 296/37.8 |
| 2012/0006871 | A1 * | 1/2012 | Strohecker | B60N 3/002 224/275 |
| 2019/0275949 | A1 * | 9/2019 | Kubota | B60R 7/043 |
| 2019/0352087 | A1 * | 11/2019 | Williams | B60R 7/043 |
| 2021/0197727 | A1 | 7/2021 | Meador et al. | |
| 2022/0348145 | A1 * | 11/2022 | Westfall | B60R 7/043 |

FOREIGN PATENT DOCUMENTS

| | | |
|---|---|---|
| DE | 19947177 B4 * | 5/2004 |
| DE | 102006023948 A1 * | 11/2007 |
| EP | 3387900 A1 | 10/2018 |
| FR | 2663275 A1 * | 12/1991 |
| JP | H049343 U | 1/1992 |
| WO | WO-03026916 A2 * | 4/2003 |
| WO | WO-2008017854 A1 * | 2/2008 |

* cited by examiner

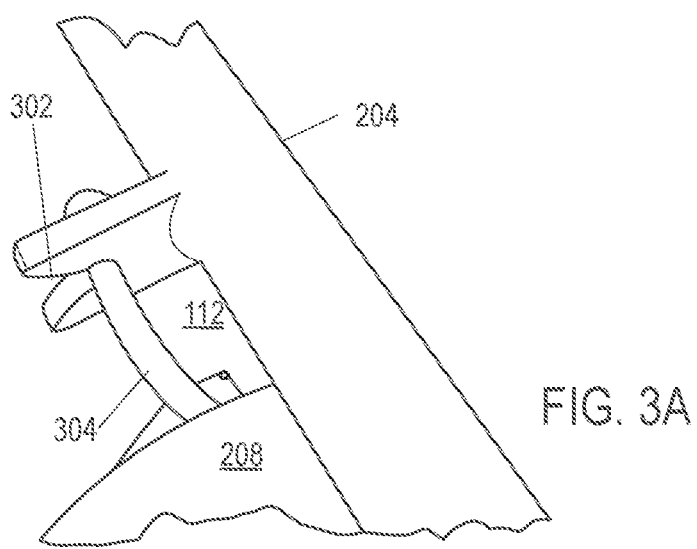
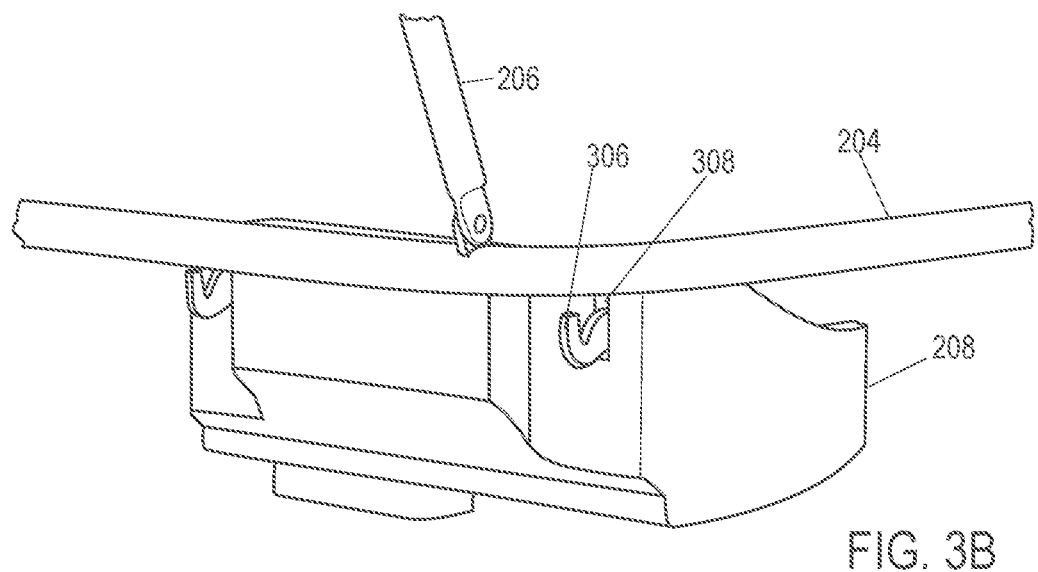
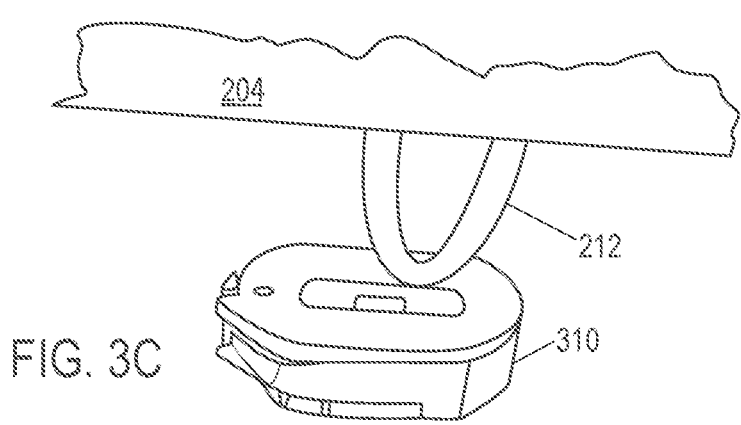

STRUCTURAL BASE AND SECUREMENT MECHANISM FOR AN INTERIOR DELIVERY CONTAINER IN A VEHICLE

CROSS REFERENCE TO RELATED APPLICATION

This application claims benefit under 35 U.S.C. § 120 to U.S. Provisional Application No. 63/250,418, filed Sep. 30, 2021, entitled "STRUCTURAL BASE AND SECUREMENT MECHANISM FOR AN INTERIOR DELIVERY CONTAINER IN A VEHICLE." The disclosure of the prior application is considered part of and is hereby incorporated by reference in its entirety in the disclosure of this application.

TECHNICAL FIELD

The present disclosure relates generally to vehicular transport of goods and, more specifically, to devices and methods that provide a structural base and securement mechanism for an interior delivery container in a vehicle.

BACKGROUND

Vehicles have been a major mode of transportation within many societies. In addition to carrying passengers, vehicles have become a means for transporting items and delivering items. As ride-sharing companies and ride-hailing companies have grown and expanded services, passenger vehicles have become a common means for delivery of items. In particular, autonomous vehicles (AVs), which can drive themselves using a variety of sensors and in-vehicle technologies, and in which there is typically no human operator who drives or otherwise controls the vehicle, may also be used to autonomously deliver items such as groceries and food to recipients.

BRIEF DESCRIPTION OF THE DRAWINGS

The following figures are provided with accompanying description to provide some examples for the understanding of the subject matter disclosed herein. A component may be labeled with a same reference numeral throughout the drawings to indicate that the component is the same component throughout the drawings where the same reference numeral is utilized.

FIGS. 3A-3C provide details of an example securement structure for an interior delivery container in a vehicle, according to some embodiments of the present disclosure.

DETAILED DESCRIPTION

Overview

A delivery container as described herein may facilitate transportation of items (i.e., delivery items) within a vehicle. For example, the delivery container may facilitate the transportation of items in an interior space of the vehicle corresponding to the rear-seat while reducing the concerns of damage to the item or the other things within the compartment of the vehicle. The vehicle container may be useful in situations where items are being transported within a passenger compartment of a vehicle, as often occurs in ride-sharing situations, ride-hailing situations, and AVs. The vehicle container may be secured within the vehicle using a securement mechanism.

Embodiments of the present disclosure provide a securement structure for a delivery container in a vehicle, the securement structure comprising a frame removably attached to a chassis of the vehicle and configured to support the delivery container securely when the vehicle is in motion.

Figure 1:
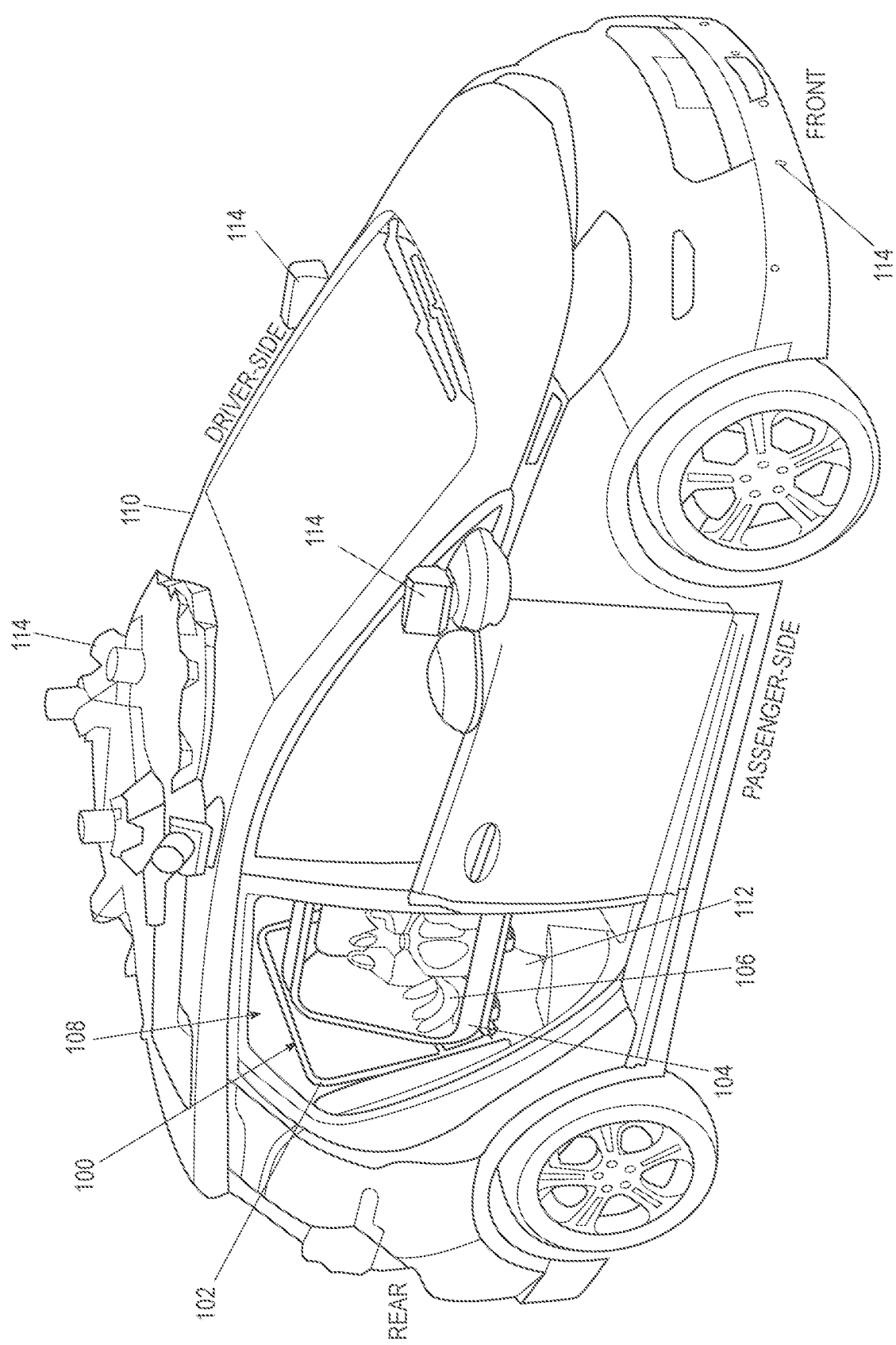
FIG. 1 provides an example vehicle with a structural base and securement mechanism for an interior delivery container, according to some embodiments of the present disclosure.

Embodiments further provide a vehicle comprising a securement structure in a rear interior space of the vehicle; and a delivery container in the securement structure. The rear interior space comprises a rear portion of the vehicle between a front row of seats and a trunk space, and the securement structure extends between a driver-side and a passenger-side of the vehicle. As used herein, the terms "driver-side" and "passenger-side" (e.g., as shown in FIG. 1 and described throughout) are used to refer to a first side of the vehicle and a second side of the vehicle respectively. These terms do not imply that the vehicle has a driver or a passenger therein at these respective sides. In an autonomous vehicle, for example, there may be no driver as such. The terms refer to the traditional sides of the vehicle according to the jurisdiction in which the vehicle is operating; for example, the sides may be reversed between the United States and the United Kingdom.

Embodiments further provide a method for attaching a securement structure inside a vehicle, the method comprising: inserting a base frame of the securement structure into the vehicle; securing the base frame to a chassis of the vehicle with hooks in corresponding key slots; engaging loops in the base frame with seat cushion grommets in the chassis; inserting a back frame of the securement structure into the vehicle; hooking the back frame over seat-back strikers in the vehicle; coupling the back frame to the base frame; inserting a front frame of the securement structure into the vehicle; and coupling the front frame to the base frame and to a floor of the vehicle.

The following description and accompanying drawings provide some examples illustrating features of the subject matter described herein. The present disclosure relates generally to vehicle transport of goods and, more specifically, to devices and methods that provide a container to be mounted within a vehicle for the transport of goods. As will be appreciated by one skilled in the art, features described herein may be embodied in various manners—e.g., as a method, a device, a system, and/or other manners.

The following detailed description presents various explanations of specific embodiments. However, the innovations described herein can be embodied in a multitude of different ways, for example, as defined and covered by the claims and/or select examples. In the following description, reference is made to the drawings where like reference numerals can indicate identical or functionally similar elements. Although reference numerals and/or letters may be repeated in the various examples, this repetition is for the purpose of simplicity and clarity and does not in itself dictate a relationship between the various embodiments and/or configurations discussed.

Example embodiments that may be used to implement the features and functionality of this disclosure will now be described with more particular reference to the accompanying FIGURES. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Other features and advantages of the disclosure will be apparent from the following description and the claims.
Description of Example Embodiments of the Disclosure The systems, methods, and devices of this disclosure each have several innovative aspects, no single one of which is solely responsible for all of the desirable attributes disclosed herein. Details of one or more implementations of the subject matter described in this Specification are set forth in the description below and the accompanying drawings.

FIG. 1 provides a simplified illustration of an example securement structure 100, according to some embodiments of the present disclosure. Securement structure 100 may comprise a frame 102 supporting a delivery container 104 that may be used to transport delivery items 106 in a rear interior space 108 of a vehicle 110. Frame 102 of securement structure 100 may be removably attached to a chassis 112 of vehicle 110 such that securement structure 100 is configured to support delivery container 104 securely when vehicle 110 is in motion. In some instances, delivery container 104 may be referred to as an interior delivery box.

In many embodiments, rear interior space 108 comprises the space in a rear portion of vehicle 110 between a front row of seats and a trunk space, for example, the space that would be commonly occupied by a rear-seat. In various embodiments, securement structure 100 may replace the rear-seat without other structural modifications to vehicle 100. Securement structure 100 may extend between a driver-side and a passenger-side across vehicle 110. In the figure, a rear passenger-side door of vehicle 110 is shown removed for ease of explanation. Securement structure 100 may permit a user (e.g., delivery person, customer, etc.) to open the rear passenger-side door of vehicle 110 and easily access delivery items 106 in delivery container 104.

In various embodiments, vehicle 110 may comprise an AV. In some such embodiments, vehicle 110 may comprise a car, to which are mounted one or more sensors 114. Sensors 114 may be mounted to various locations on vehicle 110. For example, sensors 114 may be mounted to the roof, side mirrors, the front, the rear, the driver-side and/or the passenger-side of vehicle 110, or some combination thereof. Sensors 114 may include one or more cameras, one or more light detection and ranging (LIDAR) sensors, one or more radar sensors, or some combination thereof. In some embodiments, the radar sensors may include articulating radar sensors, long-range radar sensors, short-range radar sensors, or some combination thereof. Sensors 114 may detect the surroundings of vehicle 110. For example, sensors 114 may detect one or more objects surrounding vehicle 110, such as other cars, pedestrians, trees, bicycles, objects within a road on which vehicle 110 is traveling (such as construction and/or other objects that may impede movement of the vehicle), and/or indications surrounding the vehicle 110 (such as construction signs, stop indicators, and other street signs).

Vehicle 110 may further include a computer (not shown) coupled to sensors 114. The computer may receive data captured by sensors 114 and utilize the data for localization, perception, prediction, route planning, maneuver planning, motion planning, path following, and low-level controls of vehicle 110. Further, the computer may be communicatively coupled to a server (not shown) and may exchange communications with the server. The computer may further be coupled to one or more of the systems of vehicle 110 and may control operation of throttle, braking, steering, and/or indicators of vehicle 110.

Figure 2:
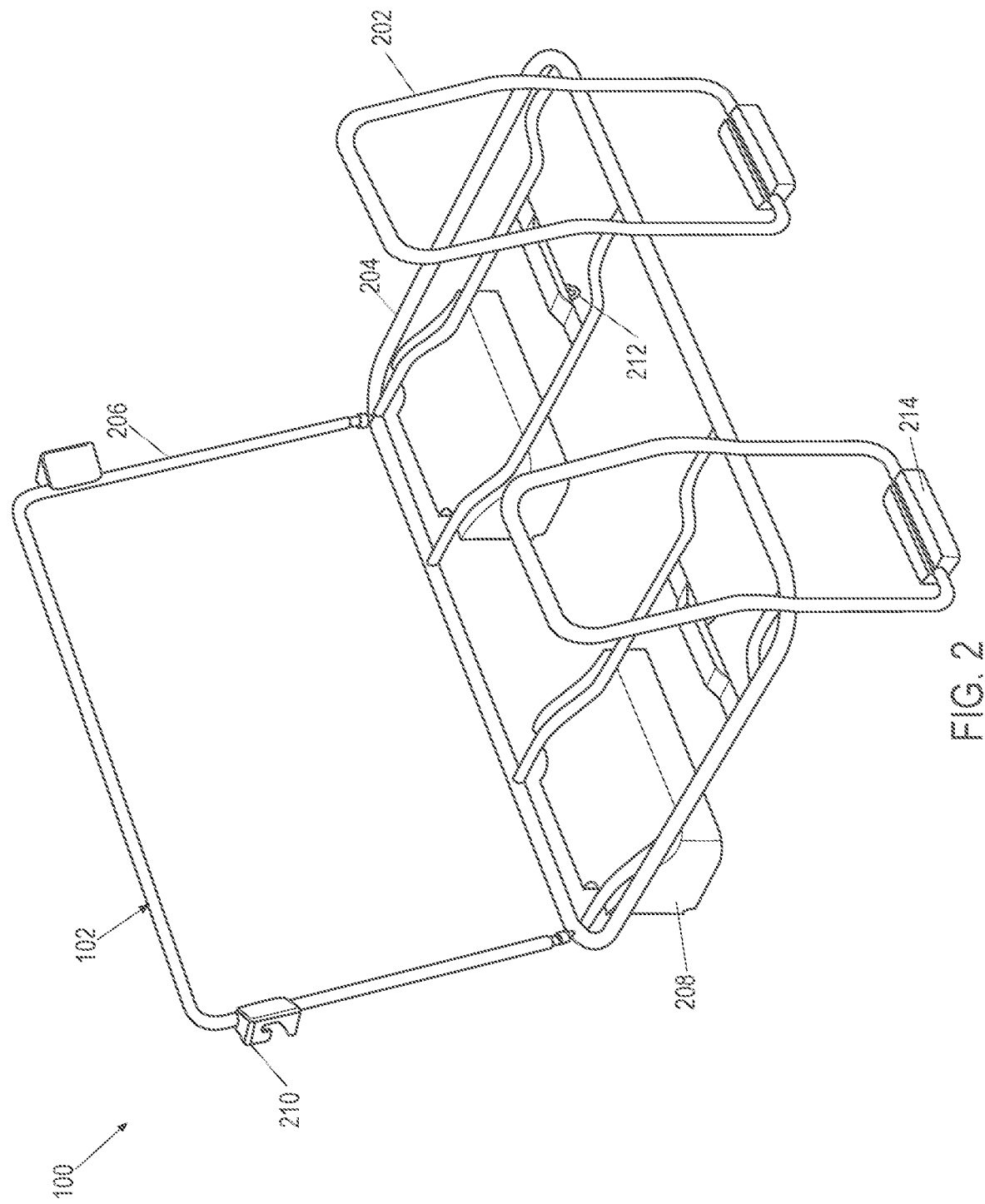
FIG. 2 is an illustration of an example securement structure for an interior delivery container in a vehicle, according to some embodiments of the present disclosure.

FIG. 2 provides a simplified illustration of example securement structure 100, according to some embodiments of the present disclosure. Frame 102 of securement structure 100 comprises tubes bent and welded (or otherwise formed) into a shape that conforms to a space corresponding to a rear-seat of vehicle 110. In many embodiments, a material of frame 102 may comprise steel. Any suitable load-bearing material, such as aluminum, carbon/glass fiber, etc. that can reliably withstand dynamic loads corresponding to delivery container 104 and delivery items 106 without catastrophic failure may be used within the broad scope of the embodiments. In some embodiments, frame 102 may comprise a front frame 202, a base frame 204 and a back frame 206, with back frame 206 attached to a first side (e.g., rear) of base frame 204 and front frame 202 attached to an opposing second side (e.g., front) of base frame 204. In some embodiments, back frame 206 may comprise a swing arm, for example, coupled with hinges or pins to base frame 206. In such embodiments, back frame 206 may be raised or lowered for different delivery container shapes and/or sizes before being fixed to chassis 112. In other embodiments, back frame 206 may be rigidly attached in a fixed configuration, for example, with nuts and bolts, to base frame 206.

In various embodiments, one or more attachment fixtures 208 under portions of base frame 204 may facilitate attaching base frame 204 to chassis 112 of vehicle 110. In some embodiments, attachment fixtures 208 may be affixed rigidly to chassis 112 and may comprise Expanded Polypropylene (EPP) foam material for shock absorption. In other embodiments, attachment fixtures 208 may form part of chassis 112, for example, molded or otherwise formed into appropriate shapes suitable to attach base frame 204. In yet other embodiments, attachment fixtures 208 may comprise portions of the rear-seat or rear-seat attachment fixtures. In some embodiments, attachment fixtures 208 may be shaped to fit into a space between base frame 204 and chassis 112 that would have been otherwise occupied by portions of the rear-seat.

In some embodiments, back frame 206 comprises one or more attachment fixtures 210 to affix back frame 206 rigidly while vehicle 110 is in motion. In some embodiments, attachment fixtures 210 may comprise hooks configured to fasten over seat-back strikers as shown in more detail in FIG. 4A. In some embodiments, base frame 204 may comprise loops 212 configured to fit into cushion grommets made for the rear-seat in chassis 112. In some embodiments, a lower part of front frame 202 may be snapped into place inside an attachment fixture 214 comprising foam-based material, or any other material softer than a material of frame 102 for shock absorption and scratch prevention (among other advantages). Attachment fixture 214 may be rigidly attached to chassis 112, for example, a floor of vehicle 110, with suitable fasteners. In other embodiments, front frame 202 may be attached directly to chassis 112, for example, the floor of vehicle 110, without attachment fixture 214, for example, with appropriate fasteners.

In some embodiments, base frame 204 comprises a safety pendant (not shown), comprising an electrical connector wired to electrical components associated with securement structure 100. The safety pendant is configured to couple with a connector (not shown) attached to chassis 112 and electrically coupled to other components in vehicle 110. In some embodiments, a portion of the safety pendant is located in a front cabin of vehicle 110, for example, conveniently near a human operator. In some embodiments, the connector comprises a plastic clip. In various embodiments, the electrical components include appropriate circuitry, controllers, etc. that permit user interaction with a user interface provided on delivery container 104. In various embodiments, delivery container 104 may be coupled a computer onboard vehicle 110 in AV applications.

The various securement devices mounted on chassis 112 as described herein are mostly components already present for other purposes, such as to secure the rear-seat, or an infant car-seat, etc. Embodiments as described herein make use of such existing securement devices to attach securement structure 100 to vehicle 110 without other major modifications to chassis 112. Moreover, components present in chassis 112, with the exception of the rear-seat, are not removed so that securement structure 100 and the rear-seat may be interchangeably secured in vehicle 110 without any added complexities, operations, mechanisms, or devices.

FIGS. 3A-3C are simplified illustrations of example attachment fixtures associated with frame 102 according to various embodiments. As shown in FIG. 3A, in some embodiments, base frame 204 may comprise slots 302 in a rear portion. Slots 302 are configured to engage with hooks 304 attached to chassis 112. In various embodiments, hooks 304 may be brazed, welded, or riveted to chassis 112 based on manufacturing ease and other considerations. In some embodiments, hooks 304 may comprise securement devices for infant seats. During assembly, base frame 204 may be tilted (e.g., backward), so that slots 302 slide onto hooks 304. Thereafter, base frame 204 may be pulled forward and tilted in the opposite direction (e.g., forward) so that slots 302 are oriented suitably (e.g., downwards) and base frame 204 is affixed to chassis 112 while vehicle 110 is in motion. In some embodiments, chassis 112 may be fitted with at least four hooks 304.

FIG. 3B illustrates a simplified view of attachment fixture 208 to which base frame 204 may be fastened. In some embodiments, base frame 204 may comprise hooks 306 welded (or otherwise attached) thereto that can engage with key slots 308 in attachment fixtures 208. In one example embodiment, base frame 204 may be pushed down so that hooks 306 fall into key slots 308 and then base frame 204 may be pulled forward to lock hooks 306 into position within key slots 308 suitably. Thereafter base frame 204 may remain affixed to attachment fixture 208 while vehicle 110 is in motion. During disassembly, base frame 204 may be pushed backward and lifted upwards, so that hooks 306 disengage from key slots 308. In some embodiments, base frame 204 may have at least four hooks 306.

FIG. 3C illustrates a simplified view of an attachment means for securing base frame 204 to chassis 112. In some embodiments, base frame 204 may comprise loops 212 configured to fit into cushion grommets 310 made for the rear-seat in chassis 112. In some embodiments, chassis 112 may be fitted with at least two cushion grommets 310 and base frame 204 configured with corresponding two loops 212.

Figure 4A:
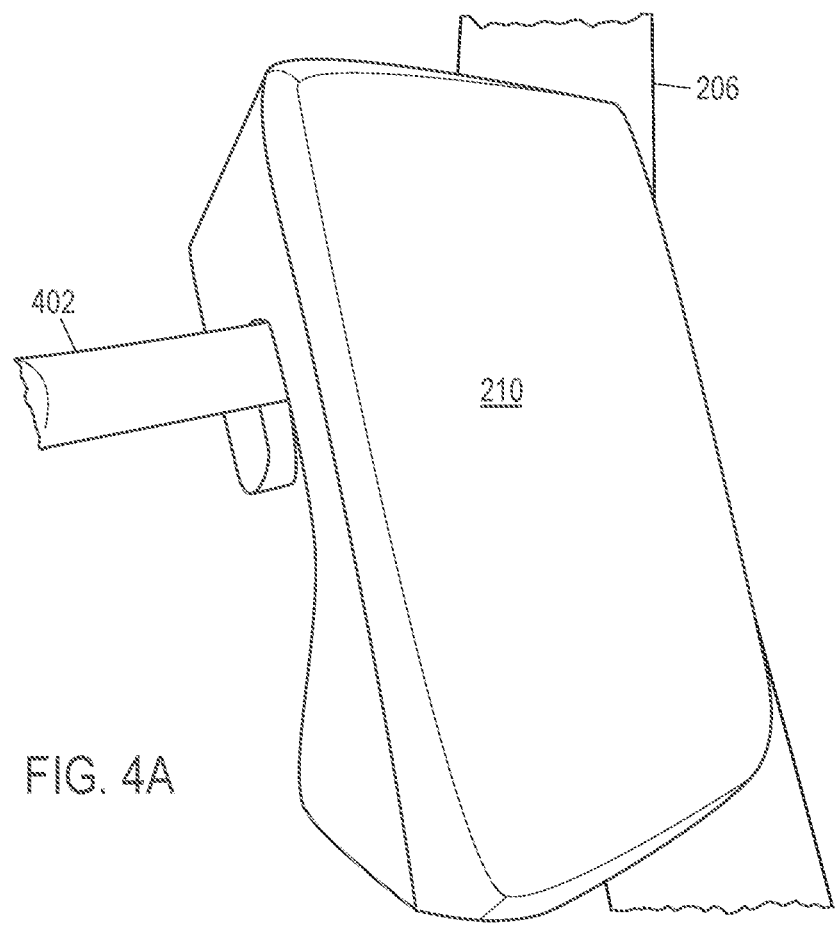
FIGS. 4A-4B provide more details of an example securement structure for an interior delivery container in a vehicle, according to some embodiments of the present disclosure.
Figure 4B:
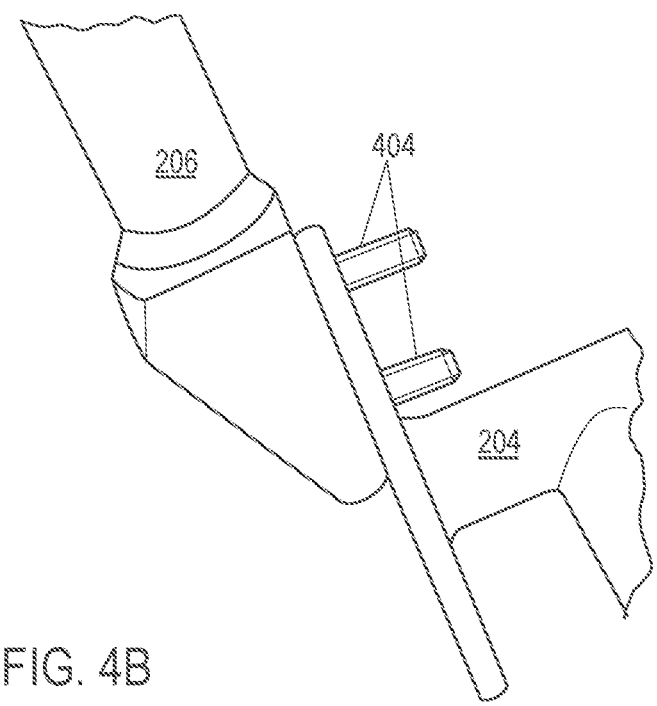

FIGS. 4A and 4B are simplified illustrations showing attachment means for back frame 206. As shown in FIG. 4A, attachment fixtures 210 comprising hooks may fasten over a seat-back striker 402. Seat-back striker 402 may comprise a rod affixed apriori to vehicle 110 and fastened rigidly, for example, with a latch or other fastening mechanism to chassis 112. Typically, the backrest (i.e., seat-back, seat-back-rest) of the rear-seat is secured to chassis 112 via a releasable latch and striker arrangement: The latch selectively engages with seat-back striker 402 to secure one to the other and, in turn, secure the position of the backrest relative to chassis 112. Often the releasable latch is attached to the backrest while the striker is fixedly and rigidly attached to chassis 112. In various embodiments, the backrest is replaced by back frame 206 having attachment fixtures 210 hooked over seat-back striker 402. Since the position of seat-back striker 402 relative to chassis 112 is fixed, the arrangement provides back frame 206 with a fixed angle of inclination. In various embodiment, attachment fixture 210 may be welded, brazed, riveted, or otherwise rigidly affixed to the tubes comprising back frame 206.

FIG. 4B illustrates an example attachment mechanism comprising bolts 404 that can be used to detachably secure back frame 206 to base frame 204. In some embodiments, instead of a nut-and-bolt attachment, back frame 206 may be pivotally affixed to base frame 204 with a pin at a corner with base frame 204, allowing back frame 206 to pivot backward and forward relative to base frame 204 around the pin, for example to accommodate delivery container 104 before back frame 206 is affixed immovably to chassis 112. In many embodiments, the combination of hook-over-seat-back striker as shown in FIG. 4A and bolts 404 as shown in FIG. 4B may allow back frame 206 to be securely attached to chassis 112 and base frame 204 while vehicle 110 is in motion.

Figure 5A:
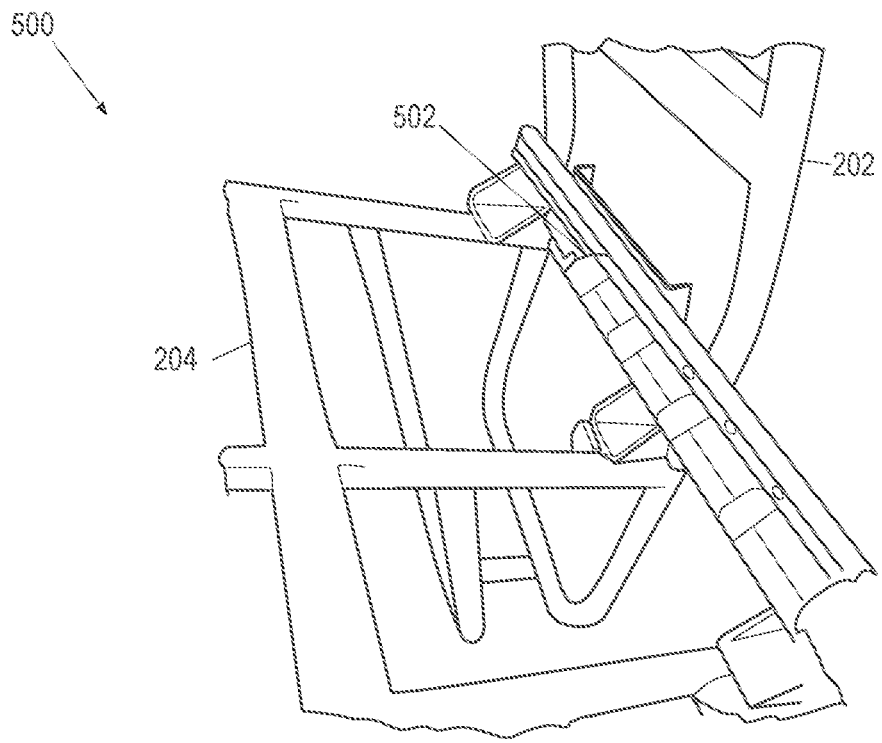
FIGS. 5A-5B provide yet more details of an example securement structure for an interior delivery container in a vehicle, according to some embodiments of the present disclosure.
Figure 5B:
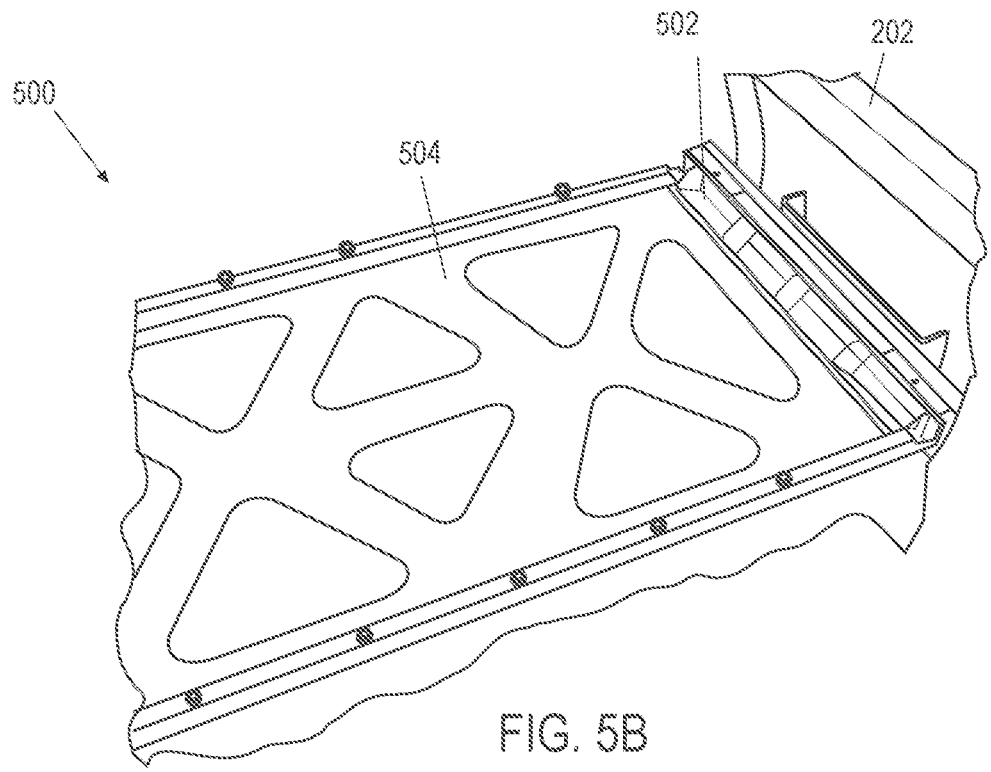

FIGS. 5A and 5B are illustrations showing a sliding tray platform 500 that may be detachably coupled to frame 102 according to various embodiments. In some embodiments, sliding tray platform 500 comprises a linear motion system comprising suitable stationary guides, rails, etc. with a movable component coupled thereto and configured to securely slide thereon. Any suitable linear motion system known in the art may be encompassed within the broad scope of the embodiments of sliding tray platform 500. A particular embodiment is shown in FIGS. 5A and 5B.

As shown in FIG. 5A, sliding tray platform comprises a pair of V-guides 502, one of the pair mounted proximate to a corner between base frame 204 and back frame 206 (not shown) and attached to back frame 206, and another of the pair mounted proximate to a corner between base frame 204 and front frame 202 (as shown) and attached to front frame 202. V-guides 502 may be attached to frame 102 using any suitable fastener, for example, screws or nuts and bolts. In some embodiments, V-guides 502 comprise rails with v-shaped or similar cross-sections that function as tracks or guides for coupled components sliding along their lengths. In various embodiments, the sliding may be facilitated by grooves, wheels, bushing, bearings, or other suitable coupling part on the mating component (e.g., sliding tray) as is known in the art.

FIG. 5B shows a sliding tray 504 removably positioned on V-guides 502. Sliding tray 504 extends between the pair of V-guides 502 across the width of base frame 204 between front frame 202 and back frame 206. Sliding tray 504 may be made of any suitable material, including aluminum, steel, plastic, etc. suitable for bearing the load of components placed thereon, including weight of delivery container 104 and delivery items 106.

Figure 6:
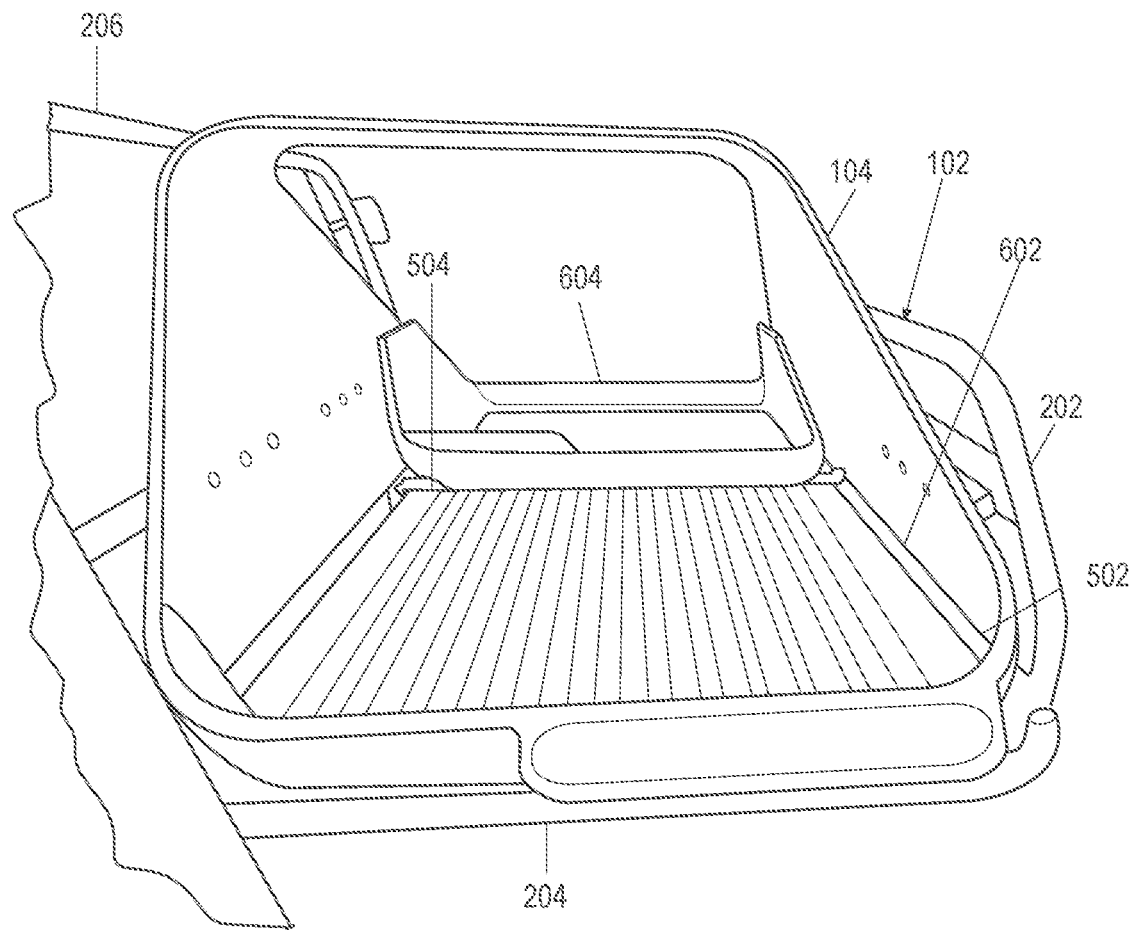
FIG. 6 is an illustration showing details of an example structural base and securement mechanism with an interior delivery container for use in a vehicle, according to some embodiments of the present disclosure.

FIG. 6 is an illustration of a delivery container 104 on frame 102. In various embodiments, delivery container 104 is rigidly attached to base frame 204 using suitable fasteners, for example, nuts and bolts. In some embodiments, delivery container 104 comprises slots 602 corresponding to location of V-guides 502 such that sliding tray 504 may be coupled to V-guides 502 through and inside delivery container 104. In some embodiments, a delivery tray 604 may be removably placed on sliding tray 504 inside delivery container 104, delivery tray 604 being any suitable contained configured to hold delivery items 106.

Figure 7:
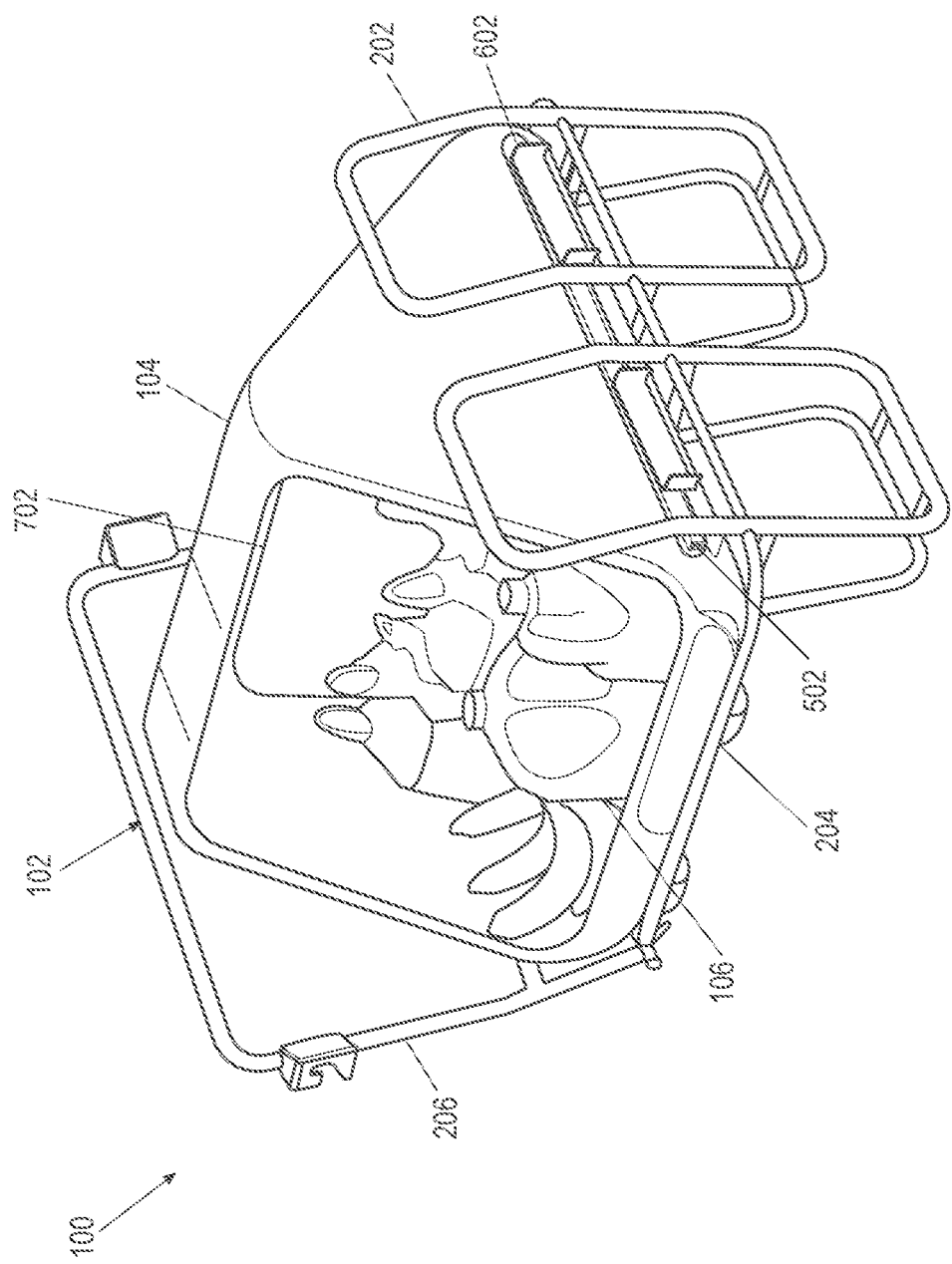
FIG. 7 is an illustration showing an example structural base and securement mechanism with an interior delivery container for use in a vehicle, according to some embodiments of the present disclosure.

FIG. 7 is an illustration of an example embodiment of securement structure 100. Frame 102 comprises front frame 202, base frame 204 and back frame 206. In the example embodiment shown, front frame 202 may be affixed to the floor of chassis 112 directly without any intervening attachment fixture 214. Delivery container 104 is securely attached to base frame 204 between front frame 202 and back frame 206. Delivery container 104 is configured to hold delivery items 106 when vehicle 110 (not shown) is in motion. In various embodiments, delivery container 104 may comprise a divider 702 configured to separate certain delivery items 106 from certain others. For example, in a scenario where delivery container 104 is used to deliver to two different users, divider 702 may appropriately separate delivery items 106 of the two users.

Figure 8:
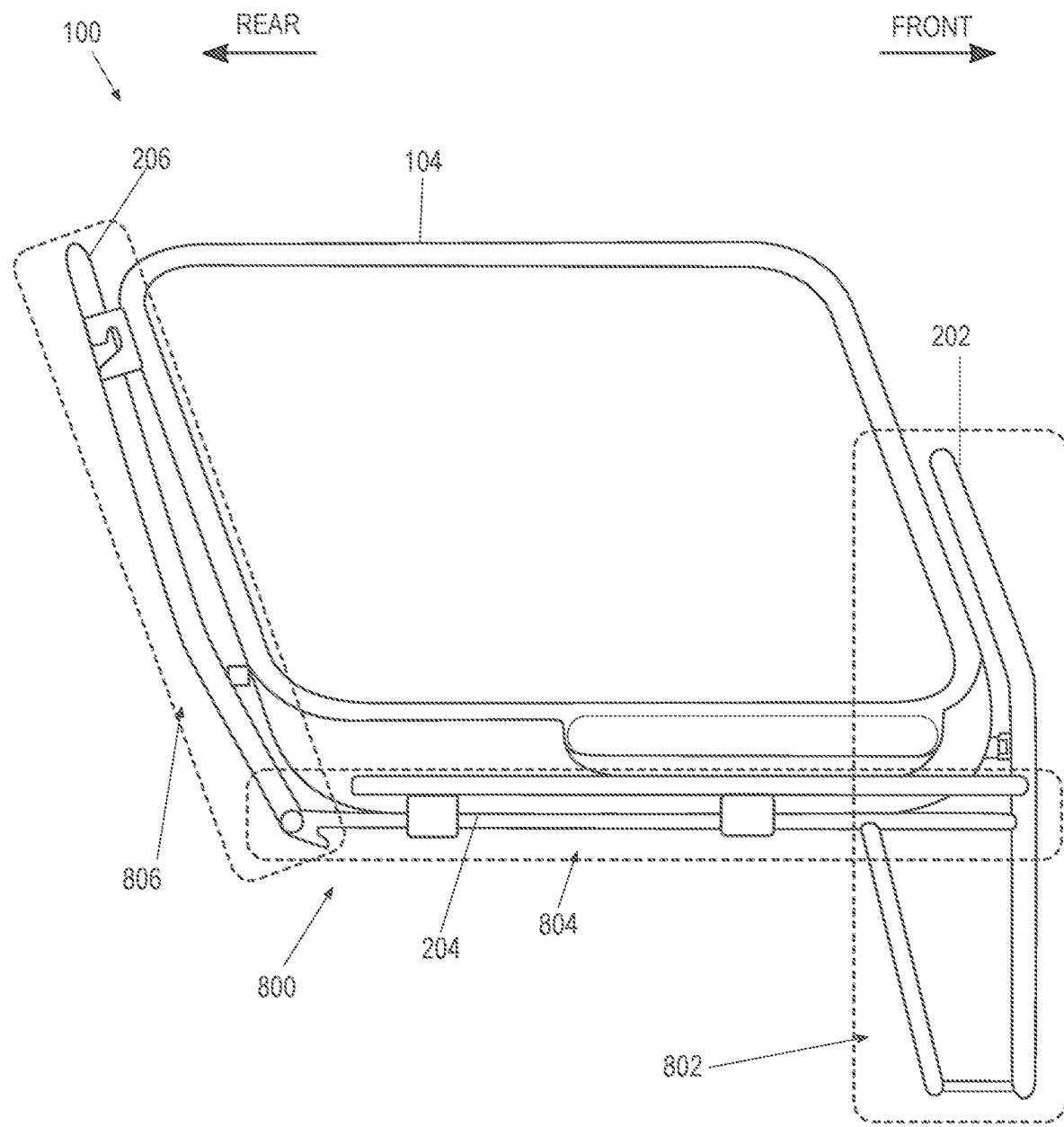
FIG. 8 illustrates a side-view of an example structural base and securement mechanism with an interior delivery container for use in a vehicle, according to some embodiments of the present disclosure.

FIG. 8 is a simplified illustration of a side-view of securement structure 100 according to various embodiments. In the embodiment shown, frame 102 may comprise tubes bent and welded into a shape that conforms to a space 800 corresponding to a rear-seat of vehicle 110. Space 800 comprises a first space 802 corresponding to a portion of the rear-seat toward a front of vehicle 110, a second space 804 corresponding to a seat-base (i.e., seat, seat-bottom, seat-pan) of the rear-seat and a third space 806 corresponding to a backrest of the rear-seat toward a rear of vehicle 110. Front frame 202 is located in first space 802, base frame 204 is located in second space 804, and back frame 206 is located in third space 806. In various embodiments, base frame 204 comprises a flat portion to mount (e.g., seat, support, hold) delivery container 104.

Figure 9:
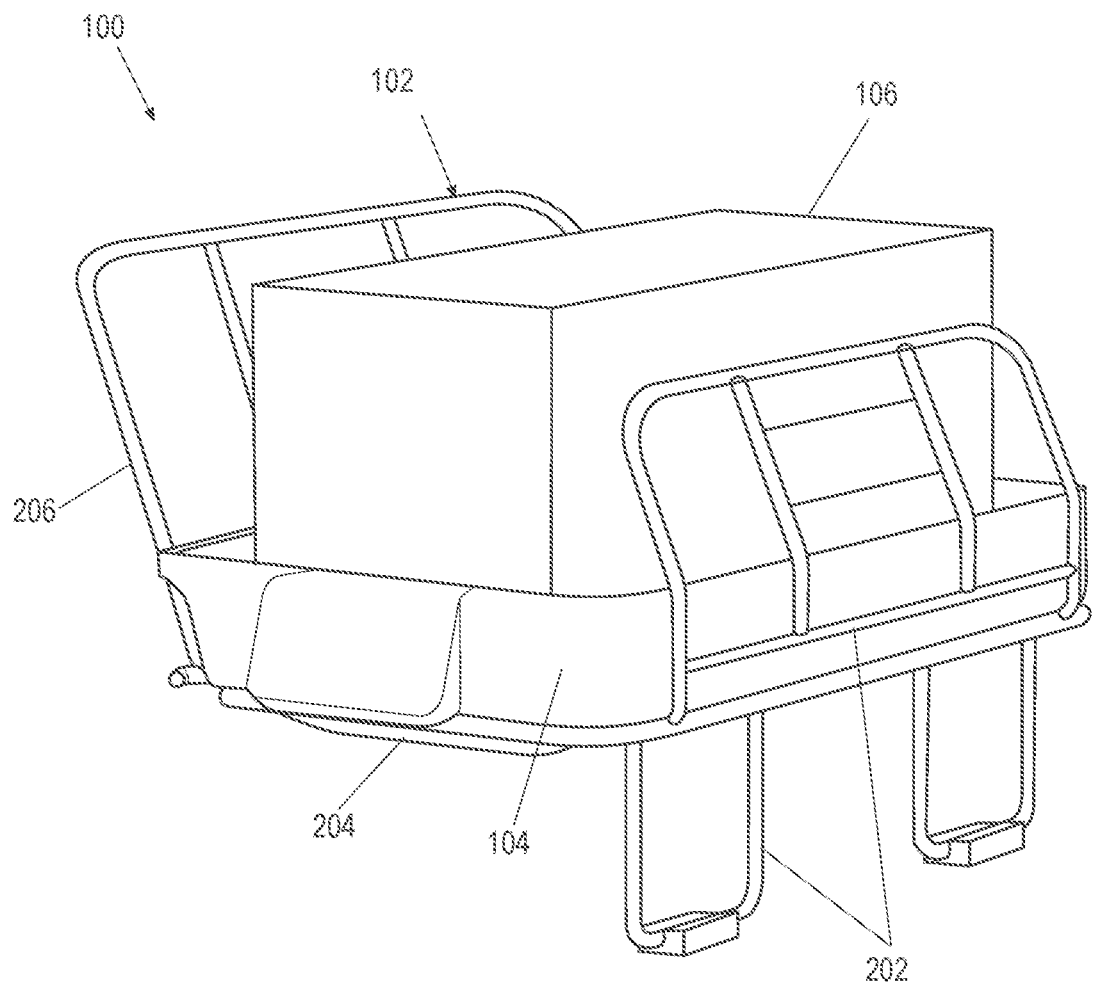
FIG. 9 illustrates another example of a structural base and securement mechanism with an interior delivery container for use in a vehicle, according to some embodiments of the present disclosure.

FIG. 9 is a simplified illustration of another example securement structure 100 according to various embodiments. As illustrated in the figure, delivery container 104 can comprise any suitable shape that can fit on frame 102 appropriately. For example, delivery container 104 may comprise a bin that can hold delivery items 106 comprising boxes or some such large volumed items. Front frame 202 may be suitably selected according to the shape of delivery item 106 and/or delivery container 104 and detachably affixed onto base frame 204, for example, replacing another front frame 202 used for a box-shaped delivery container 104. In various embodiments, front frame 202 may be detachably attached using appropriate fasteners, for example, nuts and bolts. Likewise, back frame 206 may be pivoted on pins and moved to accommodate delivery container 104 in the shape of the bin before back frame 206 is hooked over seat-back strikers 402.

Example Methods

Figure 10:
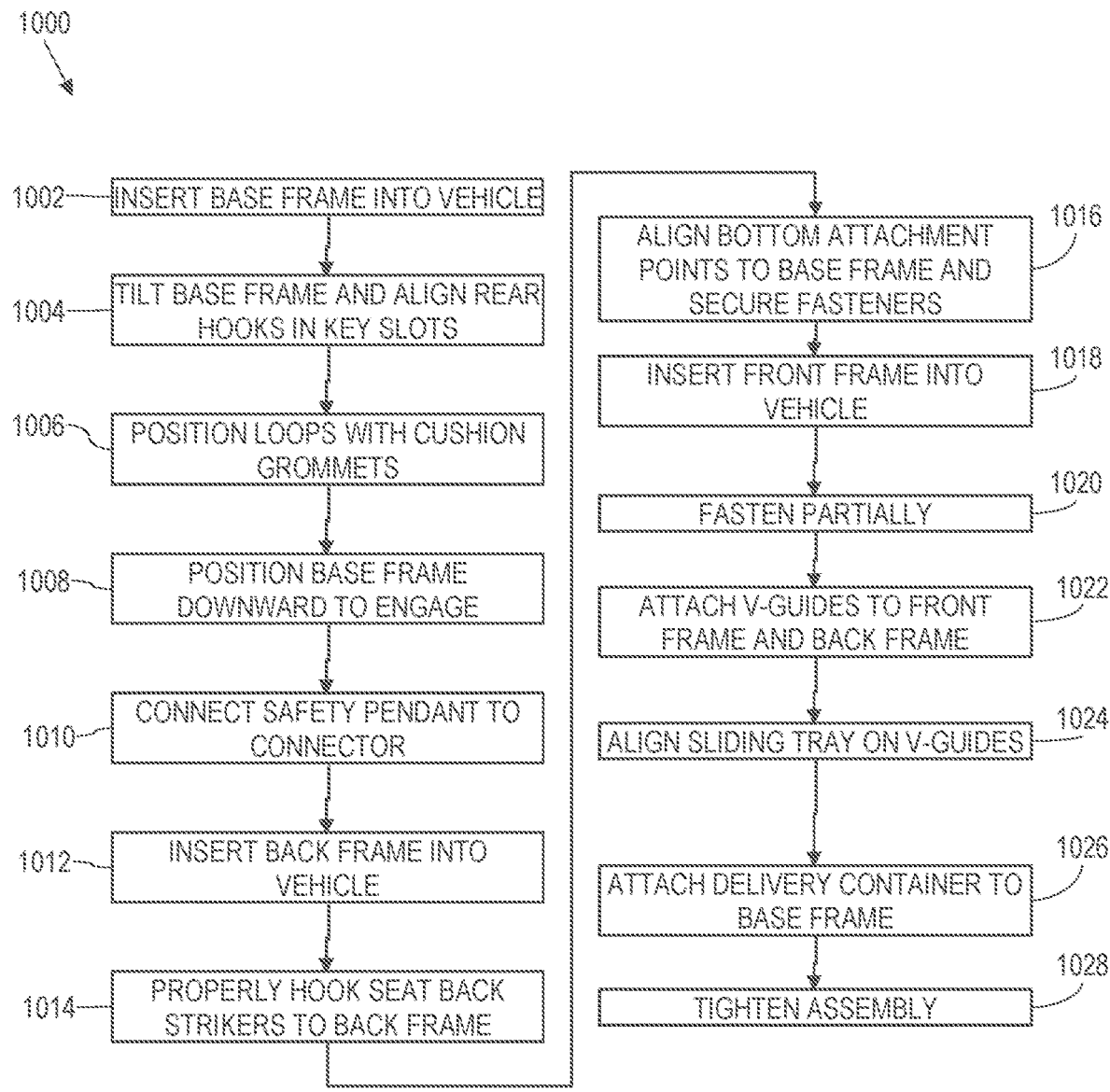
FIG. 10 is a simplified flow diagram for securing an example structural base and securement mechanism with an interior delivery container in a vehicle, according to embodiments described herein.

FIG. 10 is a simplified flow diagram illustrating an example method 1000 for attaching securement structure 100 to vehicle 110 according to various embodiments. At 1002, base frame 204 may be inserted into vehicle 110. Base frame 204 may be positioned in second space 804 corresponding to the seat portion of the rear-seat of vehicle 110. At 1004, base frame 204 may be tilted so that rear hooks 304 and/or 306 may be aligned with key hooks 302 and/or 308 respectively. In many embodiments, base frame 204 may be pushed forward to lock the hooks into the key slots appropriately. At 1006, loops 212 in base frame 204 may be positioned with cushion grommets 310 attached to chassis 112 of vehicle 110. At 1008, base frame 204 may be pushed downward to securely engage loops 212 appropriately. At 1010, a safety pendant provided with base frame 204 and comprising electrical connections to delivery container 104 may be electrically coupled to a mating connector attached to vehicle 110. In some embodiments, the safety pendant may be placed in the front cabin, for example, for ease of access for a human operator.

At 1012, back frame 206 may be inserted into third space 806 in vehicle 110. At 1014, attachment fixtures 210 may be hooked to seat-back strikers 402. At 1016, bottom attachment points of back frame 206 may be aligned to base frame 204 and secured with appropriate fasteners, for example bolts and nuts. All fasteners may be positioned correctly before torquing down. At 1018, front frame 202 may be inserted into first space 802 in vehicle 110. At 1020, fasteners used to attach front frame 202 to base frame 204 may be tightened partially. At 1022, V-guides 502 may be attached to front frame 202 and back frame 206. For example, a first V-guide may be attached to front frame 202 and a second V-guide may be attached to back frame 206. At 1024, sliding tray 504 may be positioned to align with V-guides 502. Sliding tray 504 may be moved back and forth along V-guides 502 to ensure proper alignment throughout its range of movement. If alignment is not consistent throughout range of movement, front frame 202 may be adjusted accordingly (e.g., tightened) until the desired alignment is obtained. In many embodiments where securement mechanisms of front frame 202 is not reachable after delivery container 104 is installed, front frame 202 must be tightened before delivery container 104 is attached. Thereafter, sliding tray 504 may be removed. At 1026, delivery container 104 may be attached to base frame 204 so that slots 602 align with V-guides 502 such that sliding tray 504 may be placed in V-guides 502 through slots 602. At 1028, the fasteners in the assembly may be tightened suitably. Thereafter, sliding tray 504 may be reinstalled within delivery container 104.

Although FIG. 10 illustrates various operations performed in a particular order, this is simply illustrative, and the operations discussed herein may be reordered and/or repeated as suitable. For example, one or more operations may be performed in parallel to fix several such securement structures into vehicles substantially simultaneously. In another example, the operations may be performed in a different order to reflect the preferences of a particular user and/or securement structure. Numerous other variations are also possible to achieve the desired mounting of securement structure 100 within vehicle 110. Further, additional processes which are not illustrated may also be performed without departing from the scope of the present disclosure. For example, the operations may include various lubrication, tightening, adjusting, aligning, and other such operations.

Select Examples

The following paragraphs provide various examples of the embodiments disclosed herein.

Example 1 provides a securement structure (e.g., 100 in FIG. 1) for a delivery container (e.g., 104) in a vehicle (e.g., 110), the securement structure comprising a frame (e.g., 102) removably attached to a chassis (e.g., 112) of the vehicle. The frame supports the delivery container securely when the vehicle is in motion.

Example 2 provides the securement structure of example 1, in which the frame comprises tubes in a shape that conforms to a space (e.g., 800 in FIG. 5) corresponding to a rear-seat of the vehicle, and the space comprises: a first space (e.g., 802) corresponding to a portion of the rear-seat toward a front of the vehicle; a second space (e.g., 804) corresponding to a seat of the rear-seat; and a third space (e.g., 806) corresponding to a backrest of the rear-seat.

Example 3 provides the securement structure of example 2, in which the frame comprises steel.

Example 4 provides the securement structure of any of examples 2-3, in which the frame comprises a front frame (e.g., 202 in FIG. 2), a base frame (e.g., 204), and a back frame (e.g., 206). The front frame is in the first space, the base frame is in the second space, and the back frame in the third space.

Example 5 provides the securement structure of example 4, in which the back frame is attached to a rear side of the base frame and the front frame is attached to an opposing front side of the base frame.

Example 6 provides the securement structure of any of examples 4-5, in which the base frame is attached to the chassis of the vehicle with hooks and slots (e.g., 302, 304, 306, 308 in FIGS. 3A and 3B).

Example 7 provides the securement structure of any of examples 4-6, in which the back frame is hooked to seat-back strikers (e.g., 402 in FIG. 4A).

Example 8 provides the securement structure of any of examples 4-7, in which the back frame is configured to pivot backward and forward around a corner with the base frame.

Example 9 provides the securement structure of any of examples 4-7, in which the back frame is rigidly attached to the base frame (e.g., FIG. 4B).

Example 10 provides the securement structure of any of examples 4-9, further comprising a tray platform (e.g., 500) having a first V-guide (e.g., 502), a second V-guide (e.g., 502), and a sliding tray (e.g., 504).

Example 11 provides the securement structure of example 10, in which: the first V-guide is located proximate to a corner between the base frame and the back frame and is attached to the back frame, and the second V-guide is located proximate to a corner between the base frame and the front frame and is attached to the front frame.

Example 12 provides the securement structure of any of examples 10-11, in which the sliding tray is removably positioned on the first V-guide and the second V-guide (e.g., FIG. 5B).

Example 13 provides the securement structure of example 12, in which the sliding tray can optionally include a delivery tray (e.g., 604 in FIG. 6).

Example 14 provides the securement structure of any of examples 4-13, in which the delivery container is attached to the base frame between the front frame and the back frame (e.g., FIG. 6).

Example 15 provides a vehicle (e.g., 110, FIG. 1), comprising: a securement structure (e.g., 100) in a rear interior space (e.g., 108) of the vehicle; and a delivery container (e.g., 104) in the securement structure, in which the rear interior space comprises a rear portion of the vehicle between a front row of seats and a trunk space, and the securement structure extends between a driver-side and a passenger-side of the vehicle.

Example 16 provides the vehicle of example 15, in which: the securement structure comprises a front frame (e.g., 202), a base frame (e.g., 204), and a back frame (e.g., 206), the back frame is detachably attached to a rear of the base frame, the front frame is detachably attached to a front of the base frame, and the delivery container is mounted on the base frame.

Example 17 provides the vehicle of example 16, in which the front frame is mounted to a floor of the vehicle; the back frame is coupled to seat-back strikers in the vehicle; and the base frame is attached to the chassis of the vehicle.

Example 18 provides a method for attaching a securement structure inside a vehicle, the method comprising: inserting a base frame of the securement structure into the vehicle; securing the base frame to a chassis of the vehicle with hooks in corresponding key slots; engaging loops in the base frame with seat cushion grommets in the chassis; inserting a back frame of the securement structure into the vehicle; hooking the back frame over seat-back strikers in the vehicle; coupling the back frame to the base frame; inserting a front frame of the securement structure into the vehicle; and coupling the front frame to the base frame and to a floor of the vehicle.

Example 19 provides the method of example 18, further comprising: attaching a first V-guide to a corner between the front frame and the base frame; attaching a second V-guide to another corner between the back frame and the base frame; and aligning a sliding tray between the first V-guide and the second V-guide such that the sliding tray can slide between a driver-side and a passenger-side in the securement structure.

Example 20 provides the method of any of examples 18-19, further comprising mounting a delivery container to the base frame.

Example 21 provides a structural frame comprising: a base portion having hooks (e.g., 306) to engage with slots (e.g., 308) in a rear interior portion of a chassis of a vehicle; and loops (e.g., 212) to engage with rear-seat cushion grommets (e.g., 310) in the chassis; a back portion removably attached to the base frame and having an attachment fixture (e.g., 210) that hooks over seat-back strikers (e.g., 402) in the vehicle; and a front portion that removably attaches to the base portion of the vehicle.

Example 22 provides the structural frame of example 21, further comprising: a first V-guide (e.g., 502) at a corner between the front portion and the base portion and attached to the front portion; a second V-guide at another corner between the back portion and the base portion and attached to the back portion; and a sliding tray aligned between the first V-guide and the second V-guide such that the sliding tray can slide in the frame between a driver-side and a passenger-side of the vehicle.

Example 23 provides the structural frame of any of examples 21-22, in which the base frame comprises a flat portion to mount a delivery container (e.g., 104).

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, delivery container 104 may be configured with a suitable user interface and electrical circuits to enable interaction with a user for loading and/or unloading delivery items 106. In such embodiments, for this purpose any number of electrical circuits in and around delivery container 104 may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an integrated circuit (IC) that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein have only been offered for purposes of example and teaching only. Such information may be varied considerably without departing from the spirit of the present disclosure, or the scope of the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this disclosure. In certain cases, it may be easier to describe one or more of the functionalities of a given set of flows by only referencing a limited number of elements. Similarly, methods associated with certain embodiments may be implemented using more, less, and/or other steps than those described herein, and their steps may be performed in any suitable order. It should be appreciated that the structures and electrical circuits, if any, of the FIGS. and its teachings are readily scalable and can accommodate a large number of components, as well as more complicated and/or sophisticated arrangements and configurations. Accordingly, the examples provided should not limit the scope or inhibit the broad teachings herein as potentially applied to a myriad of other architectures.

Note that in this disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

The invention claimed is:

1. A securement structure for a delivery container in a vehicle, the securement structure comprising a frame removably attached to a chassis of the vehicle, wherein:
   the frame supports the delivery container securely when the vehicle is in motion,
   the frame comprises tubes in a shape that conforms to a space corresponding to a rear-seat of the vehicle,
   the space comprises a first space corresponding to a portion of the rear-seat toward a front of the vehicle, a second space corresponding to a seat-base of the rear-seat, and a third space corresponding to a backrest of the rear-seat,
   the frame comprises a front frame in the first space, a base frame in the second space, and a back frame in the third space, and
   the base frame is attached to the chassis of the vehicle with hooks and slots.

2. The securement structure of claim 1, wherein the frame comprises steel.

3. The securement structure of claim 1, wherein the back frame is attached to a rear side of the base frame and the front frame is attached to an opposing front side of the base frame.

4. The securement structure of claim 1, wherein:
   the back frame is hooked to seat-back strikers, and
   the seat-back strikers are attached to the chassis.

5. The securement structure of claim 1, wherein the back frame pivots backward and forward around a corner with the base frame.

6. The securement structure of claim 1, wherein the back frame is rigidly attached to the base frame.

7. The securement structure of claim 1, wherein the delivery container is attached to the base frame between the front frame and the back frame.

8. The securement structure of claim 1, wherein:
   the chassis of the vehicle has slots in a rear interior portion, and
   hooks of the base portion engage with the slots.

9. The securement structure of claim 1, wherein the base portion has loops to engage with rear-seat cushion grommets in the chassis.

10. The securement structure of claim 1, further comprising a tray platform having a first V-guide, a second V-guide, and a sliding tray.

11. The securement structure of claim 10, wherein:
    the first V-guide is located proximate to a corner between the base frame and the back frame and is attached to the back frame, and
    the second V-guide is located proximate to a corner between the base frame and the front frame and is attached to the front frame.

12. The securement structure of claim 10, wherein the sliding tray is removably positioned on the first V-guide and the second V-guide.

13. The securement structure of claim 12, wherein the sliding tray seats a delivery tray.

14. A vehicle, comprising:
    a securement structure in a rear interior space of the vehicle; and
    a delivery container in the securement structure, wherein:
       the rear interior space comprises a rear portion of the vehicle between a front row of seats and a trunk space,
       the securement structure extends between a driver-side and a passenger-side of the vehicle,
       the securement structure comprises a front frame, a base frame, and a back frame,
       the base frame is attached to the chassis of the vehicle,
       the back frame is coupled to seat-back strikers in the vehicle and detachably attached to a rear of the base frame,
       the front frame is mounted to a floor of the vehicle and detachably attached to a front of the base frame, and
       the delivery container is mounted on the base frame.

15. The vehicle of claim 14, further comprising a sliding tray removably positioned in the securement structure.

16. The vehicle of claim 15, wherein:
    the securement structure further comprises a tray platform having V-guides, and
    the sliding tray is removably positioned on the V-guides.

17. The vehicle of claim 16, wherein the V-guides comprise:
    a first V-guide located proximate to a corner between the base frame and the back frame and is attached to the back frame, and
    a second V-guide located proximate to a corner between the base frame and the front frame and is attached to the front frame.

18. A structural frame comprising:
    a base portion having:
       hooks to engage with slots in a rear interior portion of a chassis of a vehicle; and
       loops to engage with rear-seat cushion grommets in the chassis;
    a back portion removably attached to the base frame and having an attachment fixture that hooks over seat-back strikers in the vehicle; and
    a front portion that removably attaches to the base portion of the vehicle.

19. The structural frame of claim 18, further comprising:
    a first V-guide at a corner between the front portion and the base portion and attached to the front portion;
    a second V-guide at another corner between the back portion and the base portion and attached to the back portion; and a sliding tray aligned between the first V-guide and the second V-guide such that the sliding tray can slide in the frame between a driver-side and a passenger-side of the vehicle.

20. The structural frame of claim 18, wherein the base frame comprises a flat portion to mount a delivery container.

\* \* \* \* \*